United States Patent [19]

Cunningham

[11] Patent Number: 4,878,690
[45] Date of Patent: Nov. 7, 1989

[54] LIGHT WEIGHT VEHICLE RESTRAINT BAG INFLATOR

[75] Inventor: Donald J. Cunningham, North Ogden, Utah

[73] Assignee: Morton Thiokol, Inc., Chicago, Ill.

[21] Appl. No.: 166,066

[22] Filed: Mar. 9, 1988

[51] Int. Cl.$^4$ .............................................. B60R 21/26
[52] U.S. Cl. .................................... 280/741; 280/736; 141/114; 141/98
[58] Field of Search ....................... 280/741, 736, 742; 141/114, 10, 98; 102/530, 531

[56]  References Cited

U.S. PATENT DOCUMENTS

| | | | |
|---|---|---|---|
| 4,005,876 | 2/1977 | Jorgensen et al. | 280/741 |
| 4,012,211 | 3/1977 | Goetz | 280/741 |
| 4,200,615 | 5/1980 | Hamilton et al. | 280/741 |
| 4,203,787 | 5/1980 | Kirchoff et al. | 149/35 |
| 4,358,998 | 11/1982 | Scheiter et al. | 280/741 |
| 4,369,079 | 1/1983 | Shaw | 149/2 |
| 4,380,346 | 4/1983 | Davis et al. | 280/736 |
| 4,547,342 | 10/1985 | Adams et al. | 422/166 |

Primary Examiner—Henry J. Recla
Assistant Examiner—Edward C. Donovan
Attorney, Agent, or Firm—James C. Simmons; Gerald K. White

[57]  ABSTRACT

A lightweight and inexpensive inflator for a vehicle passenger side restraint bag. The inflator includes a thin igniter housing member and also includes a thin arcuate barrier member which defines a combustion chamber for holding gas generant material for combustion thereof. The inflator housing has generated gas outlet apertures only on one side and the barrier member faces that side so that generated gas is directed toward the other side of the housing and is then redirected through a filter pack to the apertures. The filter pack includes a plenum providing screen which is blocked to the entrance of redirected gas by the pressing of other layers of the filter pack against the housing wall whereby the redirected gas is directed through a fibrous filter member before being directed into the plenum and out through the housing apertures. After leaving the housing apertures, the generated and filtered gas is directed through another filter pack which is disposed along the wall of the bag retainer prior to the gas flowing into the airbag.

20 Claims, 3 Drawing Sheets

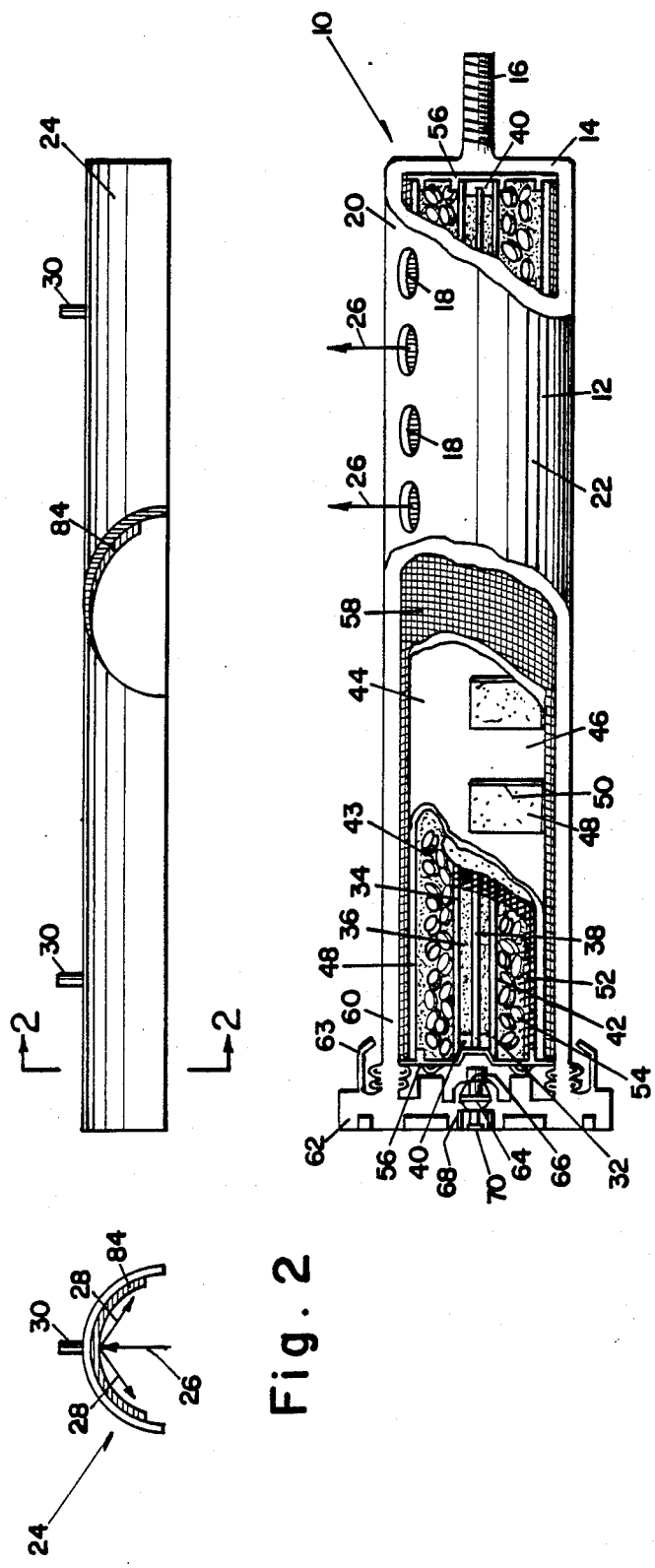

LIGHT WEIGHT VEHICLE RESTRAINT BAG INFLATOR

The present invention relates generally to gas generators. More particularly, the present invention relates to solid fuel gas generators or inflators for rapidly filling inflatable structures such as safety restraint bags otherwise known as airbags on the passenger side of automotive vehicles.

An interest in the development of passenger side airbags is that the inflators therefor be of light weight while maintaining high performance, reduced cost, and reliability.

In order to provide reduced weight, aluminum has been used for the main structural components of driver side inflators such as disclosed in U.S. Pat. No. 4,547,342 to Adams et al and assigned to the assignee of the present invention.

Typically, a passenger side inflator has an elongate generally cylindrical housing which contains a centrally disposed igniter surrounded by a combustion chamber which is in turn surrounded by a diffuser chamber which is enclosed by a housing having a thickness to withstand the pressures therein. See, for example, U.S. Pat. Nos. 4,005,876 to Jorgensen et al and 4,380,346 to Davis et al, both of which are assigned to the assignee of the present invention. In such assemblies, the igniter wall and the combustion chamber wall are typically built to have a thickness which will withstand the ignition and combustion pressures respectively therein. For example, for stainless steel, the igniter tube thickness may typically be 0.045 inch and the combustion chamber wall thickness may typically be 0.100 inch. If aluminum were used, the thickness may typically be even greater. Such thicknesses add appreciably to the overall inflator weight.

It is accordingly an object of the present invention to provide a lightweight inflator for a passenger side restraint bag.

It is another object of the present invention to provide such an inflator which provides high performance, is reliable, and is inexpensive.

It is yet another object of the present invention to provide such an inflator wherein improved filtration of the generated gas is provided so that cleaner gas may be provided to the restraint bag.

It is still another object of the present invention to provide such an inflator which is easy to assemble.

The above and other objects, features, and advantages of this invention will be apparent in the following detailed description of the preferred embodiments thereof which is to be read in connection with the accompanying drawings.

IN THE DRAWINGS:

FIG. 1 is a side view, partly in section, of an inflator including a bag retainer which embodies the present invention;

FIG. 2 is a sectional view of the bag retainer of FIG. 1 taken along the lines 2—2 thereof;

DETAILED DESCRIPTION OF THE PREFERRED EMBODIMENT

Figure 3:
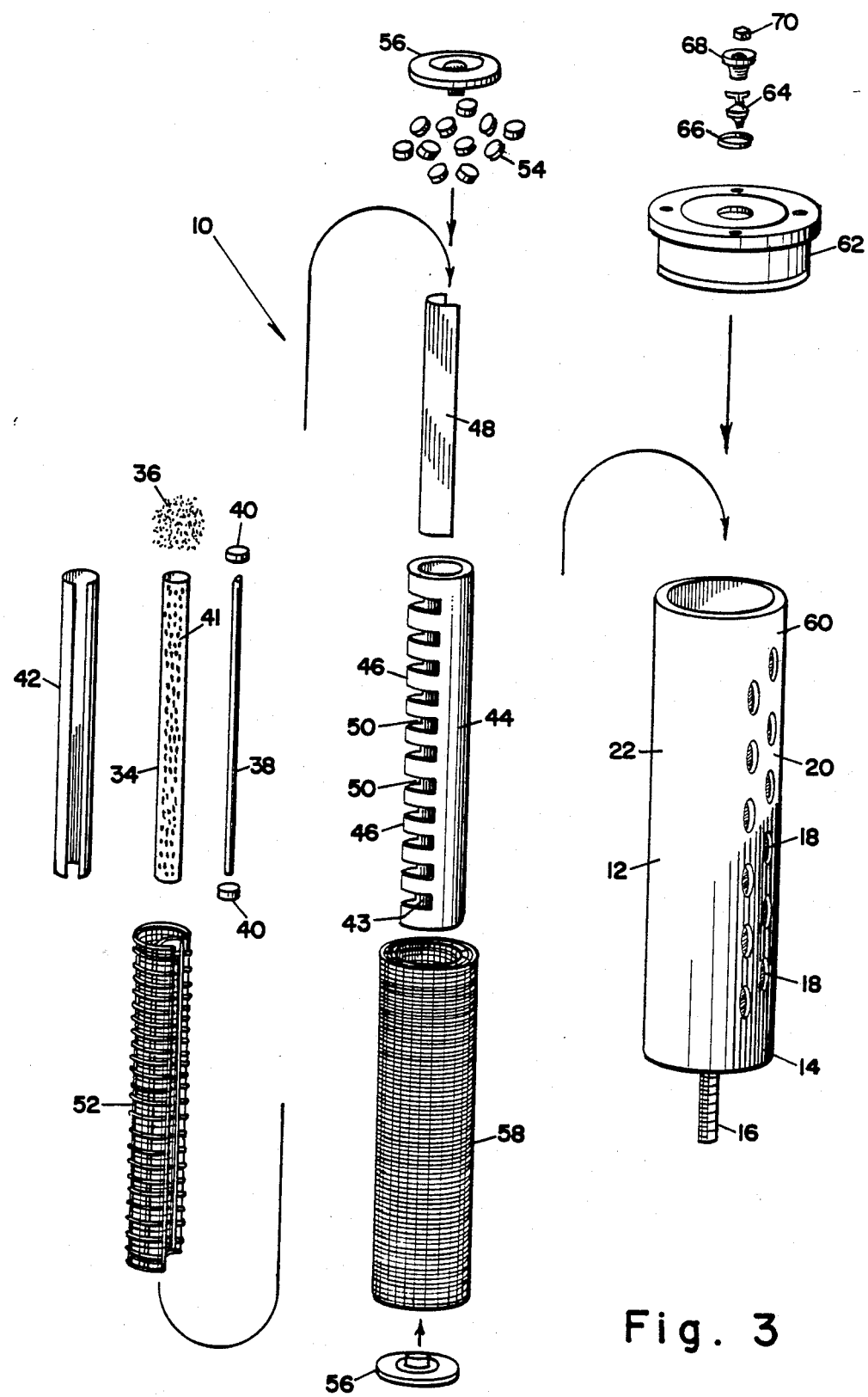
FIG. 3 is an expanded view of the inflator of FIG. 1 showing the parts in perspective and illustrating the assembly of the parts.

Referring to FIGS. 1 to 3, there is shown generally at 10 a solid fuel gas generator or inflator for passenger side automotive vehicle restraint bags otherwise known as airbags. The inflator 10 includes an elongate generally cylindrical housing 12 composed preferable of lightweight aluminum having a thickness which may be, for example, 0.130 inch adequate for withstanding the combustion pressures therein. One end 14 of the housing 12 is closed and has a threaded pin 16 for mounting of the inflator to the automobile reaction can (not shown). The housing 12 has a plurality of apertures 18 spaced longitudinally thereof along one side 20 thereof which will be called herein the first side. The apertures 18 are suitably sized, using principles of common knowledge to those of ordinary skill in the art to which this invention pertains, to provide a desired gas flow rate into the air bag (not shown). For example, the housing 12 may contain 15 apertures each having a diameter of 0.437 inch. The other side which will be called hereinafter the second side 22 is free of gas outlets or apertures for reasons that will hereinafter become apparent. For purposes of this specification and the claims, the first side 20 will be understood to extend circumferentially of the generally cylindrical housing 12 over an arc of approximately 180° thereof, and the second side 22 will be understood to extend over the other 180° of arc of the housing circumference. The housing apertures 18 route combustion gases from the inflator 10 into the bag retainer 24 and then into the airbag (not shown) which is suitably attached thereto. The bag retainer 24 is an elongate, semi-cylindrical member composed of aluminum or other suitable material which encloses the first side 20 of the inflator 10 so that the combustion gases are directed against the wall thereof as illustrated at 26 after which the gases are caused to flow into the airbag (not shown) as illustrated by arrows 28. For ease of illustration, the bag retainer 24 is shown removed from its position wherein it encloses the first inflator side 20. The airbag (not shown) is folded along the second side 22 of the inflator 10 for expanding outwardly toward a vehicle occupant in the case of an automobile accident. The retainer 24 has a pair of pins 30 spaced longitudinally thereof or other suitable means for attachment thereof to the automobile reaction can (not shown).

Centrally disposed of the housing 12 and extending longitudinally over the length thereof is an igniter 32 which comprises a thin 18 mesh perforated generally cylindrical housing member 34 such as a membrane or screen which contains igniter granules 36 surrounding an hivelite fuse 38 having a diameter of about 0.07 inch and extending over the length thereof. The ends of the igniter housing or perforated means 34 are plugged with foam plugs 40 which are press fit in the ends thereof. While it is preferred that the housing member 34 be 18 mesh and tubular in shape for containment of the igniter granules 36, it should be understood that any other suitable meshed member may be used and is meant to come within the scope of the present invention. Likewise, the fuse 38 may be of any other suitable size and type.

Although the pyrotechnic material 36 may be any of a variety of compositions meeting the requirements for rapid ignition and non-toxicity, a typical material for this use is a granular mixture of by weight 25% of boron and 75% of potassium nitrate.

Conventional igniter tubes may have thicknesses on the order of typically 0.045 inch for the purpose of withstanding the ignition pressures. However, it has been discovered that it is not necessary that the igniter housings be constructed to withstand the ignition pressures and that it is only necessary that they be thick enough to structurally contain or house the pyrotechnic material 36 prior to ignition. Thus, the igniter housing member 34, whether of stainless steel or aluminum, has a thickness preferably of less than 0.03 inch and more preferably at least about 0.02 inch such as, for example, 0.020 inch, which is appreciably less than the typical thickness of a conventional igniter tube. Thus, as the term is used herein, "thin" in reference to the igniter housing member 34 is meant to refer to a thickness which is less than 0.03 inch.

A rupturable membrane 42 such as aluminum foil is applied around the igniter housing member 34 and suitably bonded thereto to cover the perforations 41 therein to seal the igniter housing member 34.

The sealed igniter housing member 34 is inserted in a combustion chamber means which includes an elongate arcuate non-perforated thin barrier member 44. A plurality of ridges 46 are preferably integrally connected over the length of the barrier member 44 to extend between the arcuate longitudinal edges thereof to provide support for a rupturable membrane 48 such as aluminum foil while also defining slots 50 for routing of combustion gases therefrom as will be described hereinafter. The aluminum foil 48, which may have a thickness typically of 0.006 inch, is suitably bonded to the ridges 46 internally thereof to cover the slots 50 and thereby seal the combustion chamber 43 defined by the barrier member 44 and ridges 46 and to aid in controlling of combustion pressure as known to those of ordinary skill in the art to which this invention pertains. Preferably disposed adjacent the foil 48 internally thereof is an arcuate elongate combustion screen 52 of 10 mesh stainless steel which extends circumferentially over an arc of perhaps 270 degrees so that it is suitably disposed in front of the slots 50 and also supported by the ridges 46 to initially filter and cool combustion gas as it is routed from the combustion chamber 43 through the slots 50 as will be described hereinafter. The combustion chamber means 44 and 46 may contain, for example, ten slots each having a width of 0.5 inch. As the term is used in the claims, "barrier member" is meant to refer to a member or member portion which is impervious to the flow of the combustion gases therethrough. Thus, barrier member 44 is defined as terminating at the ridges 46.

A suitable solid fuel gas generant 54 is disposed in the chamber 43 between the igniter housing member 34 and the combustion screen 52. The ends of the chamber 43 are then closed by closure members 56 which also serve to locate the igniter radially. They may be press fit therein and sealed by a suitable sealant such as RTV sealant, a silicon rubber sealant manufactured by Dow Chemical Company.

Since at the lesser thicknesses disclosed herein, the relative weights of stainless steel and aluminum do not vary greatly, it is preferred that the barrier member 44 and the igniter housing member 34 be composed of stainless steel in order to resist the heat of combustion better.

Typically, combustion chambers for containment of the gas generant material may have a thickness of perhaps 0.100 inch for stainless steel and 0.130 inch for aluminum in order to withstand the combustion pressures therein. Such a thickness adds appreciably to the weight of an inflator. However, it has been found that it is not necessary that the combustion chamber have a thickness to withstand the combustion pressure as long as the housing 12 adequately withstands the combustion pressure and that the weight and size as well as cost of the inflator may be reduced by reducing the thickness of the barrier member 44 but wherein it still provides for containment of the gas generant material 54 prior to combustion and routing of gases after combustion as hereinafter discussed. Therefore, in order to provide a reduced barrier member thickness for a lighter weight inflator in accordance with the present invention, the barrier member 44 has a thickness for stainless steel which is less than about 0.04 inch and more preferably has a thickness of at least about 0.03 inch, for example, 0.032 inch, in order to prevent deformity thereof during the combustion process. For aluminum, the barrier member 44 has a thickness less than about 0.06 inch. As used in the specification and the claims, the term "thin" in reference to the barrier member 44 is meant to refer to a thickness which is less than 0.06 inch.

The gas generant composition 54 may be any one of a number of compositions meeting the requirements of suitable burning rate, non-toxicity, and flame temperature. Compositions which may be utilized include those described in U.S. Pat. Nos. 4,203,787 to Schneiter et al and 4,369,079 to Shaw, which patents are assigned to the assignee of the present invention and which are incorporated herein by reference. The gas generant material 54 may also have a form other than the pellet form which is shown. For example, the generant may be in the form of wafers.

The combustion chamber means 44 and 46 in which is disposed the igniter 32 and solid fuel 54 is then inserted in a filter pack 58 which is then inserted into the housing 12 through the open end 60 thereof. An end cap 62, composed preferably of aluminum, is then suitably attached sealingly to the housing end 60 preferably by an inertia welding process similar to that described in the aforesaid U.S. Pat. No. 4,547,342 to Adams et al which is incorporated herein by reference. The end cap 62 preferably includes a protective cover member 63 for the weld. A suitable squib 64 is sealingly disposed in an aperture in the end cap 62 by means of a suitable seal 66 and is retained in position by squib cap 68 for igniting the pyrotechnic material 36. A suitable shorting clip 70 may also be provided.

Figure 4:
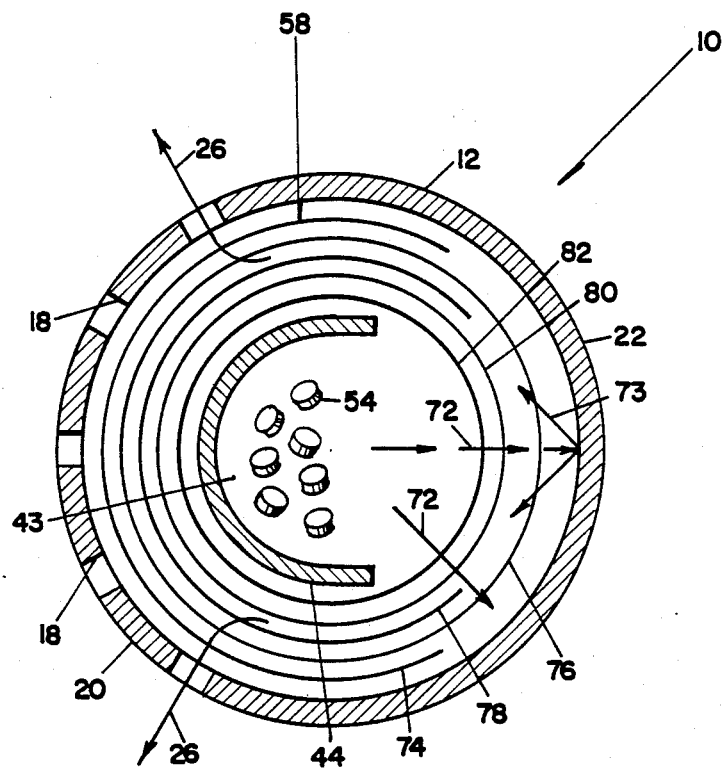
FIG. 4 is a diagrammatic view of the filter assembly for the inflator of FIG. 1.

Referring to FIG. 4, there is illustrated the positioning of the barrier 44 and filter pack 58 in the housing 12 for filtering and cooling of the generated gas. The unperforated barrier member 44 is positioned in the housing 12 to face the first side 20 whereby the barrier member 44 serves as a barrier between gas generated therein and the housing apertures 18 so that the generated gas from combustion of the gas generant pellets 54 must flow through the slots 50 in a direction toward the housing second side 22 as illustrated by arrows 72 as it leaves the combustion chamber. Thus, as illustrated in FIG. 4, generated gas will impinge the second side wall and thereafter reverse direction, as illustrated at 73, to flow along a tortuous path toward the housing first side 20 and out the apertures 18. As the generated gas impinges the second side wall, a quantity of particulate matter may be left behind on the wall.

The filter and cooling pack 58 preferably comprises several members. Beginning with the outermost member, there is provided a coarse screen member 74 of perhaps 10 mesh stainless steel which extends circumferentially over or along the housing first side 20 and which may be called a drain layer for providing a plenum for expeditious removal of filtered gas from the housing 12 through the gas outlets 18. This first screen 74 terminates, as shown in FIG. 4, generally short of the flow path 72 of generated gas as it is directed from the chamber 43 toward the housing second side 22. Adjacent the first screen 74 is a finer second screen 76 of perhaps 30 mesh stainless steel which encircles or extends circumferentially all of the way around the solid fuel chamber 43. The first screen 74 is preferably tack welded to the second screen 76 so that the first screen 74 is held in position. Adjacent the second screen 76 and inwardly thereof is filter member 78 of one or more layers of fibrous material which extends circumferentially over or along the housing first side 20 and terminates generally short of the flow path 72 of generated gas but may, as shown in FIG. 4, overlap slightly. The filter member 78 is provided for fine filtering of the generated gas. An example of a preferred filter member 78 is an alumina-silica fiber paper with a binder which holds it together for ease of handling during processing, for example, Lytherm ceramic fiber paper marketed by Mansville Co. Another example of a suitable filter paper is Sandtex paper, a silica fiber paper manufactured by the Sandtex Corporation of Japan, which provides improved filterability and pH value. A third example is 75/25 Fiberex filter material sold by National Standard of Corbin, Ky. The second screen 76 is provided to aid in holding the filter member 78 in position. Between the filter member 78 and the barrier member 44 and encircling the barrier member 44 are one or more layers of stainless steel screen such as a 30 mesh stainless steel screen 80 and, inwardly of the 30 mesh screen 80, four layers of 12 mesh stainless steel screen 82.

As generated gas is directed outwardly toward the housing second side wall, it is believed that the generated gas pushes the second screen 76 and the fourth screen members 80 and 82 outwardly toward or against the second side wall to block the drain screen 74 and to thus effect routing of the generated gases through the filter member 78 on their way to the apertures 18 on the housing first side 20 for effective filtering thereof. It is to be understood that, while the filter pack 58 as described is preferred, other suitable compositions of filter packs may be provided in accordance with the present invention.

Referring again to FIGS. 1 and 2, after the generated and filtered gas leaves the housing apertures 18, it is directed against the wall of the bag retainer 24. Disposed along the inner wall of the bag retainer 24 is a final filter pack 84 for providing additional filtering of the generated gas before it enters the airbag (not shown). This filter pack 84 may comprise, for example, a layer of the previously described Fiberex material and a layer of 30 mesh stainless steel. The filtered generated gas is thus filtered again as it changes direction on the inner wall of the bag retainer 24 and is filtered and cooled by the filter pack 84 before flowing into the airbag (not shown). The filter packs 58 and 84 serve to cool the generated gases as well as to remove particulate residue therefrom.

Functioning of the inflator 10 begins with an electrical signal from a crash sensor (not shown) through lead wires (not shown) to the initiator or squib 64. The squib 64 fires and initiates burning of the fuse 38 which in turn effects combustion of the pyrotechnic material 36. The gases from burning of the pyrotechnic material 36 pass through the perforations 41 in the igniter housing member 4 and burst through the aluminum foil 42 to ignite the plurality of gas generant pellets 54 in the chamber 43. The burning of the pellets 54 releases inflator gases which are initially filtered through the combustion screen 52 after which they burst through the aluminum foil 48 and flow through slots 50 in direction 72 to impinge on the wall of the second side 22 of the housing 12 wherein some particulate matter is removed therefrom as the gases change direction. As the gases flow through the second screen 76 and the plurality of fourth screens 80 and 82, the gases are cooled and particulate matter is removed therefrom. In addition, the second and fourth screens are pushed toward the second side wall to block the movement of the gases directly through the first screen 74. As a result, the gases pass largely through the filter member 78 as well as the second and fourth screens for finer filtering, then into the plenum provided by the first screen 74 and out the housing apertures 18. The filtered and cooled generated gases are then directed into a filter pack 84 in the bag retainer 24 for finer filtering and are thereafter redirected into an airbag (not shown) which is attached thereto.

The use of an aluminum housing as well as the provision of a thin barrier member and a thin igniter housing member permit the inflator 10 to be of light weight and inexpensive. The filter pack 58 in the inflator and filter pack 84 in the bag retainer permit improved filtering of the generated gas. Thus, what has been provided is an inflator which is inexpensive, lightweight, easy to manufacture, reliable, rugged, and provides a high quality gas.

It is to be understood that the invention is by no means limited to the specific embodiments which have been illustrated and described herein, and that various modifications thereof may indeed be made which come within the scope of the present invention as defined by the appended claims. For example, the scope of the claims is meant to include dual or multiple combustion chamber inflators.

What is claimed is:

1. An inflator for a vehicle inflatable restrain bag comprises an elongate generally cylindrical housing having first and second sides and having along said first side gas outlet means, said first side extends over an arc of said housing circumference of less than about 180 degrees, said second side extends over an arc of said housing circumference which is equal to 360 degrees less said arc over which said first side extends, said second side being free of gas outlets, the inflator further comprises an elongate arcuate barrier member which has a thickness which is less than 0.06 inch disposed within said housing and defining a chamber for holding gas generant material, gas generant material disposed within said chamber, means for igniting said gas generant material, gas filtering means disposed between said chamber and said housing, and means for directing generated gas from said chamber in a direction toward said housing second side, said barrier member being disposed between said chamber and said housing first side to prevent the flow of generated gas, as it leaves said chamber, in a direction toward said housing first side whereby generated gas may change direction after it flows out of the chamber toward the housing second side to flow through the filter means while flowing around the barrier member to the gas outlet means.

2. An inflator according to claim 1 further comprises means for supporting a foil over said generated gas directing means to seal said chamber.

3. An inflator according to claim 1 further comprises a restraint bag retainer means for receiving generated gas from said gas outlet means, said retainer means includes filter means in the path of the generated gas whereby the generated gas is filtered in the retainer means prior to its entering a restraint bag.

4. An inflator according to claim 1 wherein said barrier member has a thickness which is less than about 0.04 inch.

5. An inflator according to claim 4 wherein said barrier member is composed of stainless steel and has a thickness which is greater than about 0.03 inch.

6. An inflator according to claim 1 wherein said barrier member is composed of stainless steel and has a thickness which is equal to about 0.03 inch.

7. An inflator according to claim 1 wherein said igniting means comprises a thin perforated means for containing pyrotechnic material, pyrotechnic material disposed in said perforated means, and means for initiating said pyrotechnic material.

8. An inflator according to claim 7 wherein said perforated means has a thickness which is less than about 0.030 inch.

9. An inflator according to claim 8 wherein said perforated means is composed of stainless steel and has a thickness which is greater than about 0.02 inch.

10. An inflator according to claim 7 wherein said perforated means is composed of stainless steel and has a thickness which is equal to about 0.02 inch.

11. An inflator according to claim 1 wherein said gas filtering means between said chamber and said housing comprises, in order from said housing inwardly to said barrier member, firstly at least one first screen which extends circumferentially along said housing first side to provide a plenum for removal of generated gas from said housing through said gas outlet means and terminates generally short of the flow path of generated gas as it is directed from said chamber toward said housing second side, secondly at least one second screen which encircles said chamber, thirdly at least one filter member of fibrous material which extends circumferentially along said housing first side and terminates generally short of the flow path of generated gas as it is directed from said chamber toward said housing second side, and fourthly at least one third screen which encircles said chamber whereby the generated gas may push the second and third screens toward the housing second side to prevent by-pass of the generated gas along the first screen so that the generated gas must generally pass through the fibrous material filter member.

12. An inflator according to claim 11 further comprises a restraint bag retainer means for receiving generated gas from said gas outlet means, said retainer means includes filter means in the path of the generated gas whereby the generated gas is filtered in the retainer means prior to its entering a restraint bag.

13. An inflator according to claim 12 wherein said barrier member is composed of stainless steel and has a thickness which is less than about 0.04 inch.

14. An inflator for a vehicle inflatable restrain bag comprises an elongate generally cylindrical housing having first and second sides and having along said first side gas outlet means, said first side extending over an arc of said housing circumference of less than about 180 degrees, said second side extends over an arc of said housing circumference which is equal to 360 degrees less said arc over which said first side extends, said second side being free of gas outlets, the inflator further comprises an elongate arcuate barrier member disposed within said housing and defining a chamber for holding gas generant material, gas generant material disposed within said chamber, means for igniting said gas generant material, gas filtering means disposed between said chamber and said housing, and means for directing generated gas from said chamber in a direction toward said housing second side, said barrier member being disposed between said chamber and said housing first side to prevent the flow of generated gas, as it leaves said chamber, in a direction toward said housing first side whereby generated gas may change direction after it flows out of the chamber toward the housing second side to flow through the filter means while flowing around the barrier member to the gas outlet means, and said gas filtering means between said chamber and said housing comprises, in order from said housing inwardly to said barrier member, firstly at least one first screen which extends circumferentially along said housing first side to provide a plenum for removal of generated gas from said housing through said gas outlet means and terminates generally short of the flow path of generate gas as it is directed from said chamber toward said housing second side, secondly at least one second screen which encircles said chamber, thirdly at least one filter member of fibrous material which extends circumferentially along said housing first side and terminates generally short of the flow path of generated gas as it is directed from said chamber toward said housing second side, and fourthly at least one third screen which encircles said chamber whereby the generated gas may push the second and third screens toward the housing second side to prevent by-pass of the generated gas along the first screen so that the generated gas must generally pass through the fibrous material filter member.

15. An inflator according to claim 14 further comprises a restraint bag retainer means for receiving generated gas from said gas outlet means, said retainer means includes filter means in the path of the generated gas whereby the generated gas is filtered in the retainer means prior to its entering a restraint bag.

16. An inflator according to claim 14 wherein said barrier member is composed of stainless steel and has a thickness which is less than about 0.04 inch.

17. An inflator for a vehicle inflatable restrain bag comprises an elongate generally cylindrical housing having first and second sides and having along said first side gas outlet means, said first side extending over an arc of said housing circumference of less than about 180 degrees, said second side extends over an arc of said housing circumference which is equal to 360 degrees less said arc over which said first side extends, said second side being free of gas outlets, the inflator further comprises an elongate arcuate barrier member disposed within said housing and defining a chamber for holding gas generant material, gas generant material disposed within said chamber, means for igniting said gas generant material, gas filtering means disposed between said chamber and said housing, and means for directing generated gas from said chamber in a direction toward said housing second side, said barrier member being disposed between said chamber and said housing first side to prevent the flow of generated gas, as it leaves said chamber, in a direction toward said housing first side whereby generated gas may change direction after it flows out of the chamber toward the housing second side to flow through the filter means while flowing around the barrier member to the gas outlet means, and the inflator further comprises a restraint bag retainer means for receiving generated gas from said gas outlet means, said retainer means includes filter means in the path of the generated gas whereby the generated gas is filtered in the retainer means prior to its entering a restraint bag.

18. An inflator according to claim 17 wherein said barrier member is composed of stainless steel and has a thickness which is less than about 0.04 inch.

19. An inflator for a vehicle inflatable restrain bag comprises an elongate generally cylindrical housing having first and second sides and having along said first side gas outlet means, said first side extending over an arc of said housing circumference of less than about 180 degrees, said second side extends over an arc of said housing circumference which is equal to 360 degrees less said arc over which said first side extends, said second side being free of gas outlets, the inflator further comprises an elongate arcuate barrier member disposed within said housing and defining a chamber for holding gas generant material, gas generant material disposed within said chamber, means for igniting said gas generant material, gas filtering means disposed between chamber and said housing, and means for directing generated gas from said chamber in a direction toward said housing second side, said barrier member being disposed between said chamber and said housing first side to prevent the flow of generated gas, as it leaves said chamber, in a direction toward said housing first side whereby generated gas may change direction after it flows out of the chamber toward the housing second side to flow through the filter means while flowing around the barrier member to the gas outlet means, and said igniting means comprises a perforated means which has a thickness which is less than about 0.03 inch for containing pyrotechnic material, pyrotechnic material disposed in said perforated means, and means for initiating said pyrotechnic material.

20. An inflator according to claim 19 wherein said perforated means is composed of stainless steel.

* * * * *